United States Patent Office 2,707,672
Patented May 3, 1955

2,707,672

METHOD OF TREATING FURNACE CARBON BLACK

Carl W. Sweitzer, Garden City, N. Y., assignor to Columbian Carbon Company

No Drawing. Application March 9, 1949, Serial No. 80,572

2 Claims. (Cl. 23—209.1)

The present invention relates to carbon blacks, and more particularly to carbon blacks of the type known as furnace carbons. It provides a novel and very useful carbon black product having a unique combination of characteristics. It further provides a novel process whereby the product may, with advantage, be produced.

In my copending applications, Ser. No. 80,571, filed concurrently herewith, now abandoned and Serial No. 322,589, filed November 25, 1952, as a continuation-in-part of application Serial No. 80,571, I have described and claimed a novel process whereby furnace carbons may be fully oxidized to a pH value of about 2.5 to 3.5 without perceptible loss in weight by burning and without change in particle size or surface area. My present process is a modification of the process of said applications and results in a furnace carbon having a fully oxidized surface, of intense blackness and markedly increased oil absorption and iodine adsorption characteristics.

In accordance with the process of my copending applications just noted, the furnace carbon is uniformly heated to a temperature in the black-heat range of the particular carbon being treated but to at least 650° F. and air, or air mixed with steam, is passed in contact with the heated carbon. The temperature range to which the black is heated may be well below the ignition temperature of the furnace carbon, but, advantageously, the temperature should be only sufficiently below the ignition temperature of the carbon to avoid localized glowing or bright spots. The temperature will vary somewhat with the particular furnace black treated and whether or not steam is mixed with the air. The maximum temperature possible without glowing is usually most advantageous as the required treating time is thereby minimized. In general, where substantial proportions of steam, e. g., 10 to 25% by volume, are mixed with the air, oxidizing temperatures approximately 50° F. higher than possible with air alone may, with advantage, be employed. The maximum permissible temperature has generally been found not to exceed 1,100° F. and with most furnace blacks should not exceed 1,000° F.

In said process, the optimum treating time is largely dependent upon the treating temperature employed. The oxidation rate increases with an increase in temperature, with proportionate decrease in treating time, as just noted. The optimum time factor for any particular furnace carbon at a given oxidizing temperature is readily determined by periodically sampling the black being oxidized and testing the samples for pH characteristics. At maximum oxidation, the pH characteristics of the black will reach a minimum, usually about 2.5. In some instances the minimum attainable pH has been found to range as high as 3.5; thus varying somewhat for different blacks. When the minimum attainable pH value is reached, the treatment is immediately discontinued.

The process may be carried out by heating the black in shallow beds not exceeding ¼ inch in thickness to the desired black-heat temperature while passing air or a mixture of air and steam over the black. The treatment may be carried out in shallow trays in a heated oven.

I have now discovered that if the treatment in accordance with the process of said copending application be continued beyond the point of complete oxidation of the carbon surfaces, as indicated by the minimum obtainable pH characteristics for the particular carbon, a remarkable change in the properties of the carbon takes place. In the first stage of the treatment during which the carbon surfaces are completely oxidized, only those changes associated with increased oxidation are apparent. For instance, there is a gradual lowering of pH, an increase in the capacity of the carbon to adsorb alkalis, an increase in volatile content, and an increase in the flow characteristics in ink, and a retarding of the curing of rubber in which the resultant black is compounded. There are, however, no changes in other fundamental properties of the black, such as color, oil absorption, and iodine adsorption.

Where this treatment is continued, in accordance with my present process, the other properties of the carbon developed at the point of full surface oxidation remain constant, but the color becomes gradually blacker, the oil absorption characteristics gradually higher, and the iodine adsorption increases rapidly. A loss in weight is also observed, but this loss is far less than that experienced in conventional methods of oxidizing channel blacks to effect a comparable color change.

Reference herein to color characteristics of the carbons refer to the color, as indicated by the ABC color scale determined by the method described in the article by Sweitzer and Goodrich, appearing in Rubber Age for August 1944, pages 469, 478. Color change of a particular carbon black has been found to be a dependable index to changes in surface area by partial consumption in an oxidation treatment such as herein described whether carried out at a glowing temperature, in accordance with prior art processes, or at black-heat temperatures, in accordance with my present process. It has also been supposed that color is a dependable index to particle size diameters of the carbon. In general, an increase in the color index is indicative of an increase in surface area, a ten shade increase in blackness being roughly equivalent to one acre per pound increase in surface area.

As previously noted, though some loss in weight is experienced, this loss is much less by my process than that experienced in the oxidation of channel blacks by conventional methods for comparable color increases. I have found, for instance, that if a high modulus furnace carbon having a surface area of 5 acres per pound, equivalent to a mean particle size diameter of 60 millimicrons, be treated in accordance with my present process until the weight loss is equal to 50%, the color index of the carbon will have been increased from 90 to 150, the latter being indicative of a surface area of about 10 acres per pound, equivalent to a mean particle size diameter of 30 millimicrons. But, to effect a 50% reduction in the mean particle size diameter of a carbon would require the oxidizing away of ⅞ of the original volume of the carbon particle. Since by my process only 50% of the original weight of the carbon is lost, it is readily apparent that the increase in color is due, in part at least, to something other than decrease in mean particle size diameter.

Investigation by X-ray analysis substantiated by confirmatory tests such as iodine adsorption, the latter being indicative of total surface areas, indicates that, under the conditions of my present process, there is a selective oxidizing away of crystallites within the carbon particles resulting in the surface of the particles becoming deeply etched or pitted. This etching or pitting has been found to continue until at least one-half of the carbon particle has been oxidized away by my black-heat, low temperature oxidation. It now appears that the increased blackness of the carbon is due to the absorption of light in these tiny pits or craters on the surface of the carbon particles, as distinguished from drastic reduction in the mean particle size diameter of the carbon by burning away the greater part of the carbon as in the prior methods for treating channel blacks.

A further desirable property of carbon blacks intended for use in printing inks is a blueness of tone. This tone blueness has been ascribed to the coarseness of the particles, the coarser the particles, the bluer the tone. Where carbon blacks have been treated by prior art methods to increase their blackness, there has been a loss of much of this desirable blue tone property due to the drastic reduction in particle size. By my process, the desired blackness may be attained without a commensurate reduction in mean particle size diameters, while retaining to a major extent the blue tone of the original furnace black. The increased oil absorption and iodine adsorption characteristics of my product likewise appear to be due to the greatly increased particle surface occasioned by the pitting of the carbon particles.

The invention will be further described and illustrated by the following specific example of the application of the process to the treatment of a high modulus furnace carbon having an ignition temperature of about 950° F. The black was spread in thin layers in shallow trays in an electrically heated furnace and maintained at a temperature of 900° F. for a period of 150 minutes, while passing air by natural draft over the surface of the carbon beds. During this treatment, 50% by weight of the carbon was lost due to oxidation. The characteristics of the carbon before and after treatment are set forth in the following Table I.

Table I

|  | Original | After Treatment |
|---|---|---|
| Color—ABC index | 95 | 150 |
| Diameter in mμ (indicated by Color) | 55 | 30 |
| Surface in Acres/lb. (indicated by Color) | 5½ | 10 |
| Oil Absorption—gals./100 lbs | 11.4 | 20 |
| pH | 9.2 | 2.4 |
| Iodine Adsorption | 26×10⁻⁵ | 181×10⁻⁵ |
| Color Tone | Blue | Blue |

Substantially identical results were obtained by heating the black to a temperature of 950° F. and maintaining this temperature for a period of 120 minutes while passing a mixture of air and steam by natural draft over the carbon, instead of air alone as in the preceding example.

These operating conditions have been found optimum for this particular type of carbon, but may be changed somewhat with comparable results provided the temperature does not exceed the ignition temperature of the particular carbon being treated, but is at least about 650° F. Temperatures lower than those specifically illustrated may be used but a longer treating time will be required. It is usually desirable, as previously noted, to employ temperatures as high as possible without causing local glowing or ignition of the carbon as, at the higher temperatures, comparable results may be obtained in a shorter period of time. Likewise, the invention contemplates discontinuing the treatment at an intermediate point between that where complete surface oxidation is obtained without loss of weight and maximum increase in blackness, oil absorption and iodine adsorption to obtain a product with intermediate properties.

The relationship between time of treatment, percentage weight loss, and development of changes in characteristics is illustrated by the following examples using the same type of carbon black used in the preceding example and operating at 950° F. using a mixture of air and steam. The time in minutes, the color on the ABC color scale and the percent weight loss are set forth in the following Table II.

Table II

| Time | Color | Percent Weight Loss |
|---|---|---|
| 0 | 95 | 0 |
| 30 | 110 | 10 |
| 60 | 120 | 20 |
| 90 | 130 | 28 |
| 105 | 140 | 38 |
| 120 | 150 | 48 |

As indicated by the foregoing Table II, the second stage of the treatment may be varied in intensity depending upon the desired characteristics of the product, for instance, color, oil absorption and iodine adsorption. The intensity of the treatment may be varied either by varying the time, or the temperature, or the composition of the oxidizing gas, that is, where air alone or air plus steam is used. Frequently, carbon dioxide may, with advantage, be used in place of the steam.

The loss in weight has been found to be a dependable indication of the change in ABC color number regardless of the particular treating temperature or whether air alone, or air plus steam, or air plus carbon dioxide is used, as indicated by the test data given in the following Table III representing five runs treating the identical furnace carbon under various conditions. The data in the first column represents the loss in weight based on the original weight of furnace carbon treated and the data in the remaining columns represents the ABC color numbers of the respective samples at the point where the indicated weight loss has occurred. The data in the second and third columns are taken from runs in which a mixture of air and steam was passed by natural draft across the surface of the heated carbon, the carbon of run #1 having been heated uniformly to 950° F. and that of run #2 having been heated at 900° F. In run #3, a mixture of free air and carbon dioxide was passed gently by natural draft across the surface of the carbon uniformly heated to a temperature of 900° F. In runs #4 and #5, the carbon was heated to a temperature of 900° F. and subjected to air alone, the air of run #4 being forced air blown gently against the surface of the carbon bed, while the air of run #5 was blown gently across the surface of the carbon bed. The ignition temperature of the black treated was about 950° F.

Table III

| Weight Loss, Percent | ABC Color No. | | | | |
|---|---|---|---|---|---|
| | Run #1 | Run #2 | Run #3 | Run #4 | Run #5 |
| 5 | 103 | 103 | 103 | 101 | 102 |
| 10 | 110 | 110 | 110 | 106 | 108 |
| 15 | 116 | 116 | 116 | 112 | 114 |
| 20 | 122 | 122 | 121 | 116 | 119 |
| 25 | 127 | 127 | 127 | 120 | 123 |
| 30 | 132 | 132 | 131 | 125 | 128 |
| 35 | 137 | 138 | 136 | 128 | 132 |
| 40 | 142 | 142 | 141 | 132 | 136 |
| 45 | 146 | 147 | 146 | 136 | 140 |
| 50 | 151 | 152 | 150 | 140 | 144 |
| 55 | 156 | | 154 | 143 | 148 |
| 60 | 160 | | 159 | 147 | 152 |

Loss in weight and change in ABC color has also been found to be a convenient index to changes in oil absorption and iodine adsorption for a particular furnace black. In general, the second stage of the process should be continued until the loss in weight is at least 5% in order to effect an increase in color, oil absorption and iodine adsorption of practical significance or commercial value. Also, it is generally undesirable to continue the treatment beyond the point where loss in weight is 50%–60% of the starting material. With some furnace carbons, noticeable changes are effected even at 2% weight loss and practical advantages are usually attained when as little as 5%–10% of the carbon has been consumed. Additional advantages in color, oil absorption and iodine adsorption may be attained by continuing the treatment until as high as 75%, by weight, of the carbon has been consumed.

The invention will be further illustrated by the following specific examples of its application and the resultant product set forth in Table IV, in each of which the furnace black treated was a high modulus furnace black having an ignition temperature of about 950° F. and other characteristics indicated in the line opposite the notation "Control." Changes in these characteristics by treatment in accordance with my process to the points where the indicated weight loss were experienced are indicated in the lines following the indicated weight loss. In each test, the black was heated to a temperature of 950° F. while blowing air by natural draft over the heated black.

Table IV

|  | pH | ABC Color No. | Oil absorption, gals./100 lbs. | $I_2$ Adsorption $\times 10^{-5}$ |
|---|---|---|---|---|
| Control | 9.8 | 93 | 11.2 | 26 |
| Wt. Loss, percent: |  |  |  |  |
| 2 | 3.4 | 97 | 11.2 |  |
| 20 | 2.7 | 122 |  |  |
| 23.4 |  | 129 | 13.7 |  |
| 34 | 2.5 | 140 |  |  |
| 50 | 2.4 | 150 | 20 | 181 |
| 53 | 2.8 | 152 |  |  |
| 55 | 2.7 | 143 | 17.8 |  |
| 65 | 2.6 | 159 | 24.8 |  |
| 75 |  | 152 | 19.4 |  |

It will be observed that, where the treatment is extended to weight losses greater than about 50%, values obtained for color and oil absorption are somewhat erratic.

A structure furnace carbon having an ignition temperature about 900° F., a color index of 111 and an oil absorption number of 16.4 was heated to a temperature of 920° to 950° F., while passing a mixture of air and steam across the surface of the black by natural draft. Samples of the black were taken periodically and tested for color and oil absorption. Loss in weight was also determined at the time of taking each sample. The test results are set forth in the following Table V.

Table V

| Time | Percent wt. loss | Color | Oil Absorption |
|---|---|---|---|
| 5 | 3 | 115 | 16.3 |
| 15 | 12 | 124 | 16.5 |
| 30 | 30 | 139 | 17.2 |
| 45 | 50 | 149 | 20.8 |

A further furnace carbon of still higher structure having an ignition temperature of about 1,000° F., a color index of 89 and an oil absorption of 15.6, was heated to 950° to 1,000° F. in the presence of air and steam and samples taken and tested as in the preceding example. The results of this test are set forth in the following Table VI.

Table VI

| Time | Percent wt. loss | Color | Oil Absorption |
|---|---|---|---|
| 5 | 2 | 95 | 15.5 |
| 15 | 4 | 100 | 15.6 |
| 45 | 14 | 109 | 16.6 |
| 60 | 33 | 129 | 20.0 |
| 90 | 49 | 145 | 23.6 |

A still different furnace black having an ignition temperature of about 1,000° F., a color index of 100 and an oil absorption of 16.7 was heated at 950° to 1,000° F. for 60 minutes in the presence of air and steam. This treatment resulted in a weight loss of 42% and an increase in color and oil absorption to 144 and 23.4, respectively.

Lamp blacks may also be treated with marked advantage by my present process. For instance, under the conditions of the preceding example, the color of a lamp black was increased from 76 to 145. Under identical conditions, the color of a second carbon, a furnace black, was increased from 113 to 152 with a 40% weight loss and the color of a still further furnace black was increased from 147 to 175 with a 49% weight loss and an increase in oil absorption from 11.0 to 18.3.

The oil absorption values referred to herein are in terms of gallons of linseed oil per 100 pounds of the black determined by the stiff paste oil absorption test method described in detail on page 475 of Rubber Age for August 1944.

As illustrated by the foregoing specific examples, the characteristics of my new product, with the exception of pH value, may be varied over a considerable range by extending the treating period, or otherwise varying the severity of the treatment. The pH value is in each instance the minimum attainable for the particular black, since the surface of the black is fully oxidized. Depending upon the severity of the treatment, and somewhat upon the initial characteristics of the black, I may produce carbons having a fully oxidized surface, an ABC color number within the range of 95 to 175, a stiff paste oil absorption value of 11 to 24 gallons per 100 pounds of the black and an iodine adsorption value of 25 to 200 equivalents per gram $\times 10^{-5}$.

It will be understood that the terms "furnace blacks" and "furnace carbons," appearing in the appended claims are to be interpreted to include lamp blacks.

In the foregoing examples of specific operations, in accordance with the present invention wherein the oxidizing air was used in admixture with steam, the proportion of steam to air was, in each instance, within the range of 1:3 to 1:10.

The carbon black of my present invention possesses a unique combination of properties by reason of which it is particularly adapted to the manufacture of printing inks, paints, varnishes and the like. It has the tinting strength of fine impingement carbon black in combination with the blue tone of much coarser carbons. It has the flow characteristics of a "long ink" carbon and the smoothness of a lamp black.

The product resulting from the preferred modification of the present invention is characterized by a unique combination of properties including pH characteristics within the range of 2.5 to 3.5 and ABC color number within the range of 140-160, stiff paste oil absorption characteristics of 15 to 25 gallons per 100 pounds, the iodine adsorption value of 150 to 200 equivalents per gram $\times 10^{-5}$ and a blue tone. The color, oil absorption and iodine number characteristics are, however, subject to somewhat wider latitude depending upon the initial characteristics of the furnace black treated and the extent of treatment as measured by the weight loss.

In general, it has been found that there is a 10 point increase in ABC color number for each 10% weight loss of the furnace black. Thus, when a furnace black initially having an ABC color number of 100 is treated in accordance with the present invention to a 10% weight loss, the ABC color number of the resultant carbon will be 110. There is a substantially straight line relationship extending as far as about 75% weight loss, beyond which the process ceases to be commercially feasible. At a 20% weight loss of this carbon, the color number is 120; at a 30% weight loss, the color number is about 130; at a 40% weight loss, the color number is about 140; at a 50% weight loss, the color number is about 150, and so on.

In general, it may be said that the initial stiff paste oil absorption value of the carbon black may be doubled by the present process. Oil absorption and also iodine adsorption of the finished product will depend not only upon the original characteristics of the furnace black, but also upon the extent of treatment measured by the weight loss, as previously indicated.

I claim:

1. Process for the treatment of furnace blacks which comprises uniformly heating a quiescent, shallow bed of the furnace black, of a thickness not exceeding about ¼ inch, to a black-heat temperature not lower than 650° F. but below the ignition temperature of the particular black and not exceeding 1,100° F., no portion of the bed of black being permitted to exceed a black-heat temperature, while passing air over, and in contact with, the surface of the bed of heated black until the surface area of the particles of the black has been completely oxidized as indicated by the minimum attainable pH characteristic, within the range of 2.5 to 3.5, and then continuing the treatment at a black-heat temperature until at least 5% but not exceeding 75% of the black by weight has been consumed without ignition.

2. Process of claim 1 wherein the second stage of treatment is discontinued before in excess of 60% of the black has been consumed.

References Cited in the file of this patent

UNITED STATES PATENTS

| | | |
|---|---|---|
| Re. 19,664 | Damon | Aug. 13, 1935 |
| 2,144,971 | Heller et al. | Jan. 24, 1939 |
| 2,342,862 | Hemminger | Feb. 29, 1944 |
| 2,393,106 | Johnson et al. | Jan. 15, 1946 |
| 2,439,442 | Amon | Apr. 13, 1948 |
| 2,479,708 | Amon | Aug. 23, 1949 |
| 2,486,205 | Prosk | Oct. 25, 1949 |
| 2,499,438 | Wiegand et al. | Mar. 7, 1950 |

OTHER REFERENCES

Sweitzer et al.: The Rubber Age, vol. 55, No. 5, August 1944, pages 469–478.

Braendle et al.: "Carbon pH and Structure in Rubber Compounding," India Rubber World, vol. 119, No. 1, New York, October 1948 (pages 57–62). Presented before the A. C. S. April 22, 1948.